United States Patent [19]
Berks et al.

[11] 3,817,481
[45] June 18, 1974

[54] DEPLOYABLE SOLAR ARRAY FOR A SPIN STABILIZED SPACECRAFT

[75] Inventors: William I. Berks, Manhattan Beach; Hans F. Meissinger, Los Angeles, both of Calif.

[73] Assignee: TRW Inc., Redondo Beach, Calif.

[22] Filed: Nov. 17, 1971

[21] Appl. No.: 199,539

[52] U.S. Cl. ................................ 244/1 SS, 136/89
[51] Int. Cl. .......................................... B64g 1/10
[58] Field of Search .......... 244/1 SS, 1 SA; 136/89

[56] References Cited
UNITED STATES PATENTS

| | | | |
|---|---|---|---|
| 3,089,043 | 5/1963 | Gold | 136/89 X |
| 3,459,391 | 8/1969 | Haynos | 244/1 SS |
| 3,473,758 | 10/1969 | Webb | 244/1 SS |
| 3,510,086 | 5/1970 | Arbeitlang et al. | 244/1 SS |
| 3,544,041 | 12/1970 | Billerbeck et al. | 244/1 SS |

*Primary Examiner*—George E. A. Halvosa
*Assistant Examiner*—Barry L. Kelmachter
*Attorney, Agent, or Firm*—Daniel T. Anderson; Donald R. Nyhagen; Jerry A. Dinardo

[57] ABSTRACT

A deployable solar array for a spin stabilized spacecraft having a number of thin flexible solar panels spaced circumferentially about the spacecraft body, and deployment means secured to the panel ends for effecting centrifugal deployment of the panels from a launch configuration in which the panels are drawn firmly against the body so as to conform to the circumferential surface to a deployed configuration in which the panels are disposed outwardly from the body, at least between the panel ends, to provide a solar array having an effective area exceeding substantially the circumferential surface area of the body. In certain disclosed embodiments, the ends of the solar panels are wound on rotary drums from which the panels unwind during deployment in such a way that the deployed panels have lobe-like or wing-like configurations and the panels may be retracted to stowed configuration and deployed any number of times in flight. In other disclosed embodiments, the ends of the solar panels are attached to cables which are payed out from the spacecraft to deploy the panels. The panels of the latter embodiment may be joined end to end so as to deploy to an annular panel structure surrounding the body in outwardly spaced relation to the body. In one of these latter embodiments, the cables are attached to drums on the spacecraft body on which both the cables and panels may wind to permit both deployment and retraction of the panels in flight.

3 Claims, 6 Drawing Figures

PATENTED JUN 18 1974  3,817,481

William I. Berks
Hans F. Meissinger
*INVENTORS*

BY
*Donald R. Nyhagen*
ATTORNEY

William I. Berks
Hans F. Meissinger
INVENTORS

BY
ATTORNEY

William I. Berks
Hans F. Meissinger
INVENTORS

ATTORNEY

DEPLOYABLE SOLAR ARRAY FOR A SPIN STABILIZED SPACECRAFT

This invention is related to the invention disclosed in co-pending application number 159,726, filed July 6, 1971, entitled "Deployable Annular Solar Array" and assigned to the assignee of this application.

BACKGROUND OF THE INVENTION

1. Field of the Invention

This invention relates generally to the space field and more particularly to a novel deployable solar array for spacecraft.

2. Prior Art

Spacecraft are commonly equipped with solar arrays for converting solar energy to electrical energy. In order to satisfy the electrical power requirements of most spacecraft, the effective area of the array must be relatively large. For this reason many spacecraft are equipped with deployable solar arrays which may be retracted to a compact stowed configuration for launch and then deployed to operating position in space. Other spacecraft, such as spin stabilized satellites, have a solar panel surrounding and attached directly to the outer circumference of the spacecraft body. These latter solar panels have an effective surface area limited by the spacecraft body dimensions.

SUMMARY OF THE INVENTION

The present deployable solar array is composed of a number of thin flexible solar panels spaced circumferentially about the body of a spin stabilized spacecraft. Secured to the panel ends are deployment means for effecting centrifugal deployment of the panels from a launch configuration to a deployed configuration. In launch configuration, the solar panels bear against and conform to the circumference of the spacecraft body. In deployed configuration, at least the central portions of the solar panels are disposed outwardly from the spacecraft body to provide a solar array with an effective area exceeding substantially the circumferential area of the body.

Several inventive embodiments are disposed. In one of these embodiments the ends of the solar panels are secured to rotary drums spaced about the circumference of the spacecraft body. When in launch configuration, the ends of the panels are wound on the drums to retain the panels in stowed configuration whereby they bear against and conform to the circumference of the body. Deployment is accomplished by rotation of the drums to unwind the solar panels which they deploy outwardly under the action of centrifugal force into a lobe-like or wing-like deployed configuration to form a solar array. The solar array may be retracted and deployed any number of times in flight.

In another disclosed embodiment, the ends of the solar array panels are attached to cables secured to reels on the spacecraft body. When in launch configuration, the cables are wound on their reels to hold the panel ends against the body, and the panels are folded between the cables flat against the body circumference. Straps or other retaining means hold the panel folds against the body. After launch, the retaining means are released and the cables are payed out from their drums. The solar panels then deploy outwardly under centrifugal force. The panels may be joined end to end so as to deploy to an annular configuration surrounding the spacecraft body in outwardly radial spaced relation to the body. A modified version of the latter embodiment has the cables attached to drums on the spacecraft body on which both the panels and cables may wind to permit both deployment and retraction of the solar array in flight.

DESCRIPTION OF THE PREFERRED EMBODIMENTS

Figure 1:
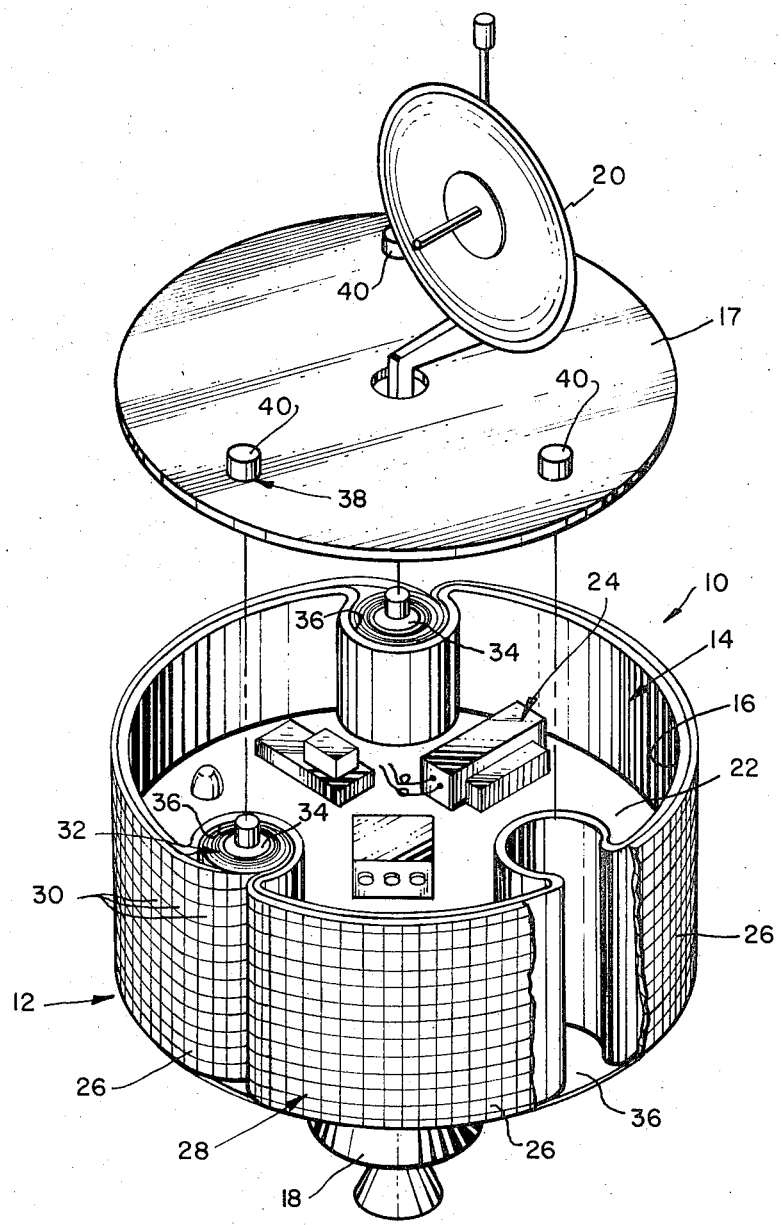
FIG. 1 is a partially exploded perspective view of a spacecraft mounting a solar array according to the invention and showing the array in its launch configuration.

FIG. 1 illustrates a spin stabilized spacecraft 10 mounting a solar array 12 according to the invention. Spacecraft 10 has a generally cylindrical body 14 with an annular sidewall 16 and endwalls or platforms 17. At the lower end of the body is a booster engine 18. At the upper end of the body is a despun antenna 20 coupled to a despun mechanism (not shown). A platform 22 within the body mounts instruments and other components 24.

Figure 2:
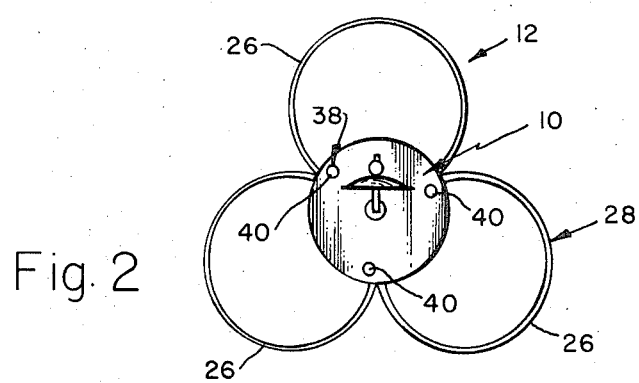
FIGS. 2 and 3 illustrate two different deployed configurations of the solar array in FIG. 1.
Figure 3:
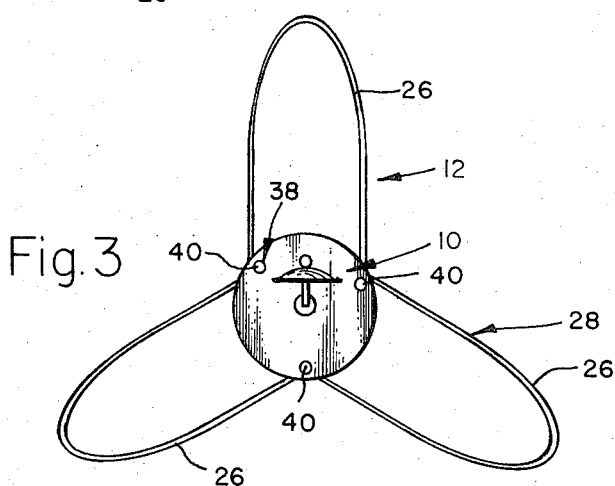

Solar array 12 comprises a number of thin flexible solar panels 26. Solar panels 26 mount solar cells 30 on their outer surfaces. Solar panels 26 are spaced about the spacecraft body 14 circumferentially and have a combined circumferential length substantially exceeding that of the body perimeter. Secured to the ends of the panels 26 are deployment means 32 for effecting centrifugal deployment of the panels from a launch configuration (FIG. 1) to a deployed configuration (FIGS. 2 and 3). In launch configuration, the solar panels 26 bear against and conform to the outer surface of the spacecraft body 14. In deployed configuration, the panels arch outwardly from the spacecraft body in a lobe-like configuration (FIG. 2) or a wing-like configuration (FIG. 3) to provide a solar array 12 with a relatively large effective area exceeding substantially the circumferential area of the spacecraft body 14.

In the particular inventive embodiment under discussion, the deployment means 32 comprise rotary drums 34 spaced circumferentially about and having their axes parallel to the longitudinal axes of the spacecraft body 14. Drums 34 are contained within recesses 36 in the body sidewall 16 and are rotatably supported at their ends in bearings (not shown) carried by the body endwalls or platforms 17. The ends of the solar panels 16 are attached to the drums 34. Means 38 are provided for driving the drums 34 in a direction to wind up the panels 26 on the drums and either driving the drums or releasing the drums for rotation in the opposite direction to effect unwinding of the panels from the drums by centrifugal force. In the particular inventive embodiment illustrated, the drum operating means 38 comprise reversible synchronous motors 40 for driving the drums in unison in either direction of rotation. Motors 40 are powered from an electrical power source and controlled by a control system on the spacecraft 10. This control system may be actuated automatically or by command signals from the ground. In the particular embodiment shown, the adjacent solar panel ends are wound on a common drum. Conceivably, however, the adjacent panel ends may be wound on separate drums.

Solar array 12 is retracted to its launch configuration of FIG. 1 by energizing the motors 40 to drive the drums 34 in directions to wind up the solar panels 26 on the drums until the portions of the panels between drums bear against the spacecraft body 14. In the particular embodiment shown, the drums are driven in the anticlockwise direction to thus retract the solar array. After the spacecraft has been launched into its selected flight path, the solar array is deployed by either releasing the drums for free rotation or by energizing the motors 40 to drive the drums in a direction to unwind the panels from the drums. The panel sections then deploy outwardly under the action of centrifugal force resulting from the spinning motion of the spacecraft.

The configuration assumed by the solar panels 26 when deployed depends on the effective deployed length of the panels. For example, if the deployed length of the panels is relatively short, the panels will assume a generally lobe-like deployed configuration, as shown in FIG. 2. If the panels have a relatively long deployed length, they will assume a generally wing-like deployed configuration, as shown in FIG. 3. In either case, the deployed solar array 12 has an effective area exceeding substantially the circumferential area of the spacecraft body 14. Solar array 12 possesses the advantage of being retractable and deployable any number of times in flight.

Figure 5:
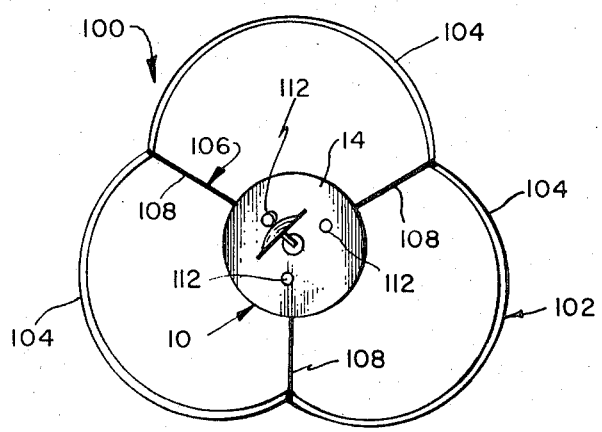
FIG. 5 illustrates the deployed configuration of the solar array in FIG. 4.
Figure 4:
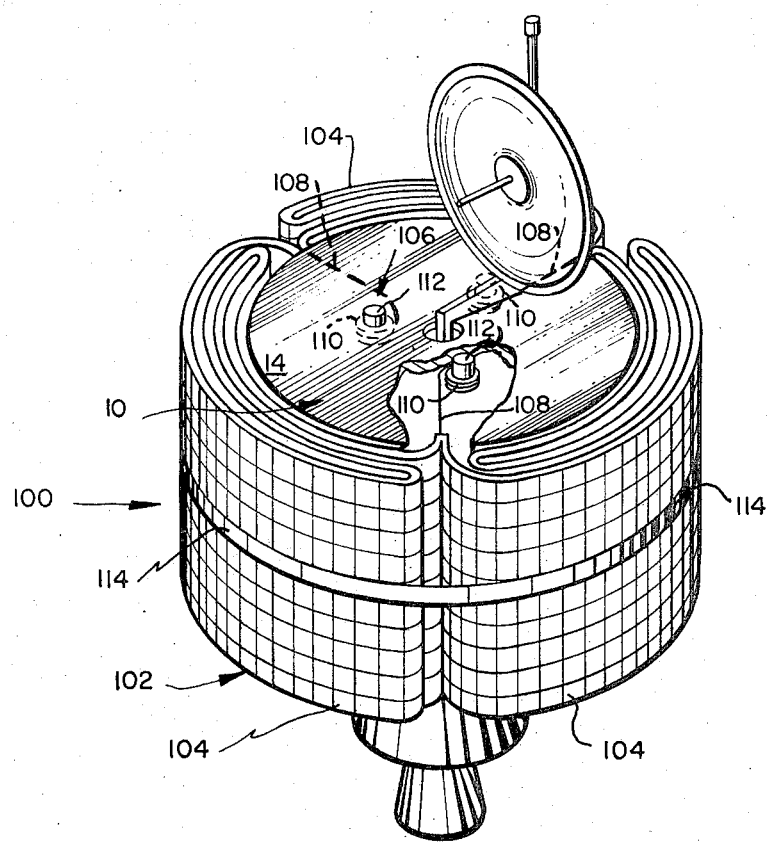
FIG. 4 is a perspective view of a spacecraft mounting a modified solar array according to the invention and showing the array in its launch configuration.

The modified deployable solar array 100 of FIGS. 4 and 5 has an annular flexible solar panel 102 circumferentially surrounding the body 14 of a spacecraft 10 and composed of a number of thin flexible panel sections 104 joined end-to-end and panel deployment means 106. Deployment means 106 comprises cables 108 attached at one end to the solar panel 102 along the joined edges of the panel sections 104. Preferably stiffeners are secured to the panel sections along their joined edges, and the cables are attached to these stiffeners. The opposite ends of the cables are attached to drums or reels 110 on the spacecraft body 14. Means 112 are provided for driving the reels in a direction to wind up the cables on the reels and either driving or releasing the reels for rotation in the opposite direction to unwind the cables from the reels. The reel driving means 112 shown comprise reversible synchronous motors for driving the reels in either direction of rotation.

Solar array 100 is retracted to its launch configuration of FIG. 4 by driving the reels 110 in directions to wind the cables 108 on the reels until the joined ends of the panel sections 104 bear against the circumference of the spacecraft body 14. The panel sections are then folded against the body, as shown. The panel sections are retained in their folded launch configuration by retaining straps 114 or other retaining means. After the spacecraft has been launched into its selected flight path, the retaining means 114 are released, as by pyrotechnic cutters severing the retaining straps, and the reels 110 are either driven or released for free rotation in the opposite direction. The solar panel 102 then deploys outwardly under the action of centrifugal force to its deployed configuration of FIG. 5. In its deployed configuration, the solar panel has a generally annular shape and surrounds the spacecraft body 14 in radially spaced relation thereto so as to provide a solar array having an effective area exceeding substantially the circumferential area of the body.

Solar array 100 possesses the advantage over solar array 12 of a more uniform or constant electrical output. This is due to the generally cylindrical deployed configuration of the array 100 as contrasted to the lobed deployed configuration of the array 12. Thus, as the solar array 12 rotates in flight with its spinning spacecraft, its illuminated area, that is the array illuminated by sunlight at any given instant, varies in periodic fashion because of the lobed configuration of the array. The electrical output of the array then also varies or fluctuates in periodic fashion. In contrast, as the solar array 100 rotates in flight with its spinning spacecraft, its illuminated area and hence its electrical output remains relatively constant because of the generally cylindrical shape of the array. This advantage of the solar array 100 may be enhanced by increasing the number of deployment cables 108 to cause the deployed array to conform more clsely to a true cylinder.

From the standpoint of electrical output, therefore, the solar array 100 is superior to the solar array 12. However, the array 100 is inferior to the array 12 for the reason that unlike the latter array, array 100 cannot be retracted to its stowed configuration in flight. This, of course, is due to the fact that the array panel sections 104 must be folded to their stowage configuration and then retained by the straps. While retraction of the solar array in flight may not be an operational requirement on all space missions, it may be on certain missions, such as those which involve docking of two spacecraft, flight through a meteoroid field, or other circumstances.

Figure 6:
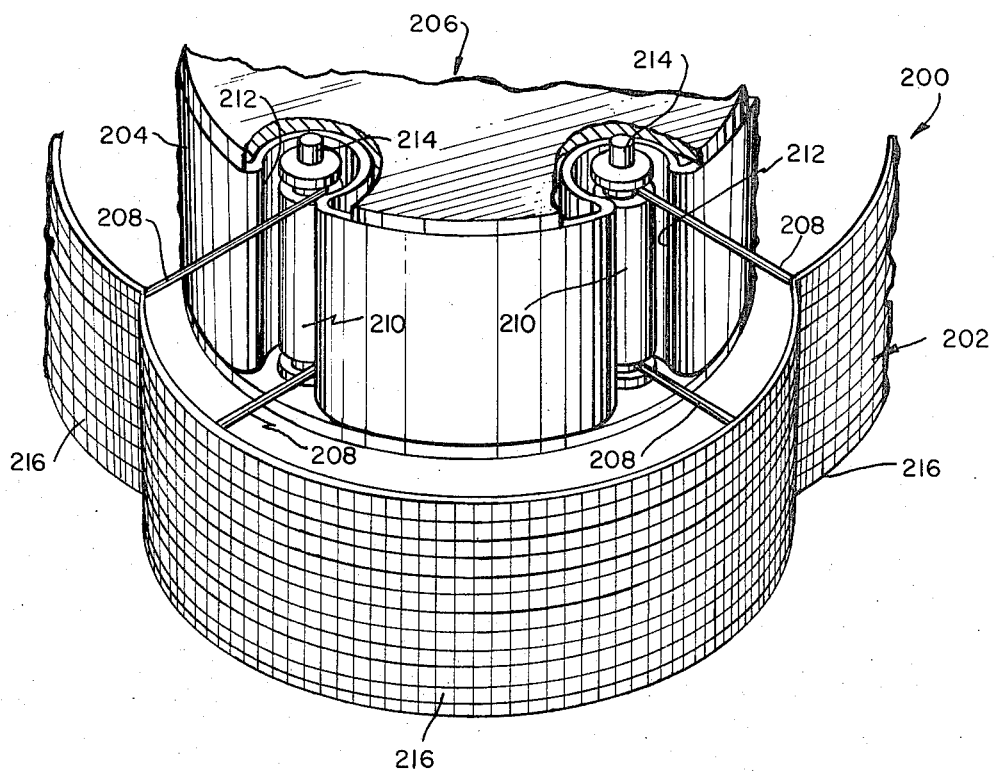
FIG. 6 is a fragmentary perspective view of a further modified solar array according to the invention.

The modified solar array 200 of FIG. 6 combines the advantages of both arrays 12 and 100, i.e., capability of retraction and deployment in flight and relatively uniform or constant electrical output. To this end, the solar array 200, like the solar array 100, has a thin flexible annular solar panel 202 surrounding the body 204 of a spin-stabilized spacecraft 206 and attached to the body by cables 208. The inner ends of the cables 208 are attached to motor driven array deployment drums 210 similar to those of the solar array 12 located within recesses 212 about the circumference of the spacecraft body 204. Drums 210 are preferably circumferentially recessed to receive the cables, as shown.

The solar array 200 is retracted to its stowage configuration for launch by driving the drums 210 by their motors 214 to first wind up the cables 208 and then the ends of the solar panel sections 216 on the drums. Accordingly, in the full retracted stowage configuration of the solar array 200, the solar panel sections 216 are drawn firmly against and into conforming relation with the circumference of the spacecraft body 204, in much the same way as are the solar panels of the solar array 12. After orbit is achieved, the drums 210 are driven or released to rotate in the opposite directions to effect centrifugal deployment of the solar panel 202 to its illustrated annular deployed configuration.

We claim:

1. A spin stabilized spacecraft comprising:

a spacecraft body;

a number of thin flexible solar panels of approximately equal length joined end to end to form an annular flexible solar array surrounding said body circumferentially; and deployment means including rotary storage drums spaced circumferentially about said body inwardly of its circumference in its deployed position; and secured to said panels along their joined ends and means to effect rotation of said drums for reeling said panel ends inwardly to contract said solar array to a launch configuration wherein said panels are held firmly against and conform to the circumference of said body and unreeling said panel ends outwardly to effect centrifugal deployment of said solar array to a deployed configuration wherein said panels billow outwardly from said body, said drums being located inwardly of the body circumference in the deployed configuration of said panels.

2. A spacecraft according to claim 1 wherein:
said panel ends are directly attached to said drums.

3. A spacecraft according to claim 1 wherein:
said panel ends are attached to said drums by cables which wind on and unwind from said drums.

* * * * *